United States Patent
Murray et al.

(10) Patent No.: US 6,622,142 B1
(45) Date of Patent: Sep. 16, 2003

(54) DATABASE UTILITIES

(75) Inventors: John Murray, Sugar Land, TX (US); Tom Harper, Houston, TX (US)

(73) Assignee: Staktek Group, L.P., Austin, TX (US)

( * ) Notice: Subject to any disclaimer, the term of this patent is extended or adjusted under 35 U.S.C. 154(b) by 0 days.

(21) Appl. No.: 09/548,156

(22) Filed: Apr. 13, 2000

Related U.S. Application Data

(60) Provisional application No. 60/129,119, filed on Apr. 13, 1999.

(51) Int. Cl.[7] .............................................. G06F 17/30
(52) U.S. Cl. ........................................ 707/100; 707/101
(58) Field of Search ................................ 707/100, 101, 707/102, 103, 104, 200, 203, 204, 202

(56) References Cited

U.S. PATENT DOCUMENTS

| | | | | |
|---|---|---|---|---|
| 5,761,667 A | * | 6/1998 | Koeppen | 707/101 |
| 5,991,761 A | * | 11/1999 | Mahoney et al. | 707/100 |
| 6,070,170 A | * | 5/2000 | Friske et al. | 707/202 |

* cited by examiner

*Primary Examiner*—Sanjiv Shah
(74) *Attorney, Agent, or Firm*—Scott D. Denko

(57) ABSTRACT

A system and methods for rapid unloading and reorganization of hierarchical databases. Overflow and a window of blocks are progressively read into memory. Unloading proceeds as the scan cylinders window moves ahead. The reading of blocks stays about scan cylinders ahead of the unload. As a segment is unloaded, its space is converted to free IMS space and when appropriate, combined with adjacent free space already in the block. Thus about a window behind the unload point in the data base, all of the segments in a block will have been converted to free space making the block one unit of free space. There will then be no further references to this block and it may be page released back to the OS memory management. Thus no paging subsystem I/O occurs. Where data remains in the data space at the conclusion of the unload, errors are noted that would otherwise have gone unnoticed. When a new database is populated with segments from a disorganized database, the invention provides methods for advance calculation of what the segment RBA is going to be in the database to be reloaded. The proxy dataset consists of proxy blocks. Each proxy block in the proxy data set is represented by a counter that denotes the space available in the proxy block. Segments are unloaded in an algorithmic order that corresponds to a hierarchical relationship in the database. As the segments are unloaded, rather than a literal load of the proxy dataset, the length of each segment is sequentially deducted from the proxy block counter. Because, in a preferred embodiment, the proxy load uses the same algorithm that will be used to actually populate the new reorganized dataset, at each proxy segment load, the counter may be used to calculate the RBA the segment will exhibit in the reorganized dataset. Stored in a table is the segment's current and future RBA. The logical parent or logical child RBA pointer of segments that participate in logical relationships is used to search the RBA table. When a match is found, the RBA in the segment's prefix is replaced with the corresponding new RBA found in the table. For segments in databases being reorganized, the RBA for segments in logical relationships is used to search the RBA table. When a match is found, the new RBA is placed in the segment pointer field in place of the old or prior RBA.

24 Claims, 8 Drawing Sheets

| ESDS | FSAP RAP | 00 A$_1$ | 01 B$_1$ | 03 C$_1$ | 06 C$_2$ | 09 B$_2$ | 11 B$_3$ | 13 C$_3$ | 16 D$_1$ | 17 E$_1$ | 18 E$_2$ | Free space | VSAM |

DATABASE UTILITIES

RELATED APPLICATIONS

This application is related to and takes its priority from U.S. provisional Patent Application No. 60/129,119, filed on Apr. 13, 1999, entitled "IMS Database Utilities" which is hereby incorporated in its entirety by reference.

FIELD OF THE INVENTION

This invention relates to databases and database management systems and, in particular, to hierarchical database maintenance.

BACKGROUND OF THE INVENTION

Ideally, when data is stored in a database, it should be stored in physical proximity to other data to which it is related. Such proximal storage will reduce disk traffic and I/O access frequency. Over time, however, as data is deleted and added to the database, data that should be physically proximal or "clustered" becomes dispersed across the database and storage vehicles (DASD, for example) on which the database is resident.

Some database systems, such as IBM's Information Management System ("IMS DL/I" or alternatively, "IMS"), allow construction of data sets with free space distributed through the storage space. IMS provides that ability to specify that a portion of each block or control interval be reserved as free space, during the initial load or reorganization of a database. Every n-th block may also be reserved in entirety. There are two free space parameters that specify the percentage of free space for each block and the other specifies the frequency of completely free blocks.

Free space can be helpful or harmful. It will increase the amount of disk space required and may result in extra I/O's. The challenge is to allocate the right amount of free space during database design so that disk space is minimized while the likelihood of fitting additions in the optimum block is maximized. The volume of additions must be estimated as well as the distribution of those additions. Too much free space is an inefficient use of resources, and too little results in increases in seek time and increased I/O operations.

Databases express relationships between units of data. In a hierarchical database system, such as IBM's IMS, data is organized in a tree-like structure. Each unit of data is known as a segment and related segments are together known as a record. From a root segment, all other segments in the record bear a direct or indirect subordinate relationship. The root segment of a record is established by the database description or definition process ("DBD"). A segment which depends immediately from the root is a child segment and a child segment may be a parent to segments further from the root.

Over time, databases tend to enlarge unevenly so that some groups or "clusters" of related data increase in population more quickly than others. When data is inserted in an IMS data base, IMS uses a documented strategy that tries to place a segment to be inserted as close as possible to segments to which it is related. IMS first tries to place the segment into the block where related segments reside. If that is not possible, IMS tries to place the segment at least in the same track as related segments. If that is not possible, placement in the present, previous or next cylinder is attempted, and so on until it has searched for room both ahead of and behind the placement area. The available placement area is defined by a "SCAN cylinders" statement specified when the data base is generated during the DBD process. If still there is no available room, the segment is placed at the end of the data set in an area known as "overflow." The overflow area is not contiguous with the root addressable area ("RAA"). If overflow becomes full, IMS will attempt to place the segment anywhere in the data base that room can be found. If there is insufficient free space early in the placement process, data becomes physically dispersed from the data to which it should be proximal. As data becomes dispersed, the read disk head must travel further to access that data and wait longer to complete the random seek on a particular track. Consequently, periodic rearrangement of the no longer clustered data in the database can result in significant improvement in database performance including increased storage efficiency and improved operational speed. Such rearrangement is known in the art as "reorganization."

Basic IMS access techniques such as Hierarchical Sequential Access Method (HSAM) use sequential access to find a particular segment. The access request starts at the first root, then examines each root sequentially until the destination root is found and then searches up the tree according to certain rules until the target segment is found. Later IMS access techniques developed as part of IMS Version II introduced the hierarchical direct (HD) access methods. Hierarchical direct access methods such as the Hierarchical Indexed Direct Access Method (HIDAM), for example, allow indexed access to any root segment based upon its "key" to its offset from the beginning of the data set to the prefix of the root segment of the target record. This requires that a segment in an HD database never move within a dataset until the data base is reorganized.

Even though physical adjacency between logically related segments improves database efficiency, the functional or logical relationship between segments in an HD access IMS database is not expressed through the physical adjacency of those segments in the database. The segments within a data base record in an HD IMS data base are connected using four-byte Relative Byte Address pointers ("RBA"). A RBA pointer is a four-byte field in a segment that designates the starting position of the destination segment relative to the beginning of the dataset. Fixing segment location makes it feasible to use pointers from one segment to other specific segments in other data bases or partitions and from secondary indexes. Pointer use in segments is also valuable within a data base to connect a parent segment to the first or first and last occurrence of each segment type. Pointers can also be used to establish secondary indexes through which an alternative organizational hierarchy perspective or an entry point for the record alternative to the root can be constructed.

Logical relationships can be established to logically link two segments which exist in separate physical databases, partitions or data sets. A logical child is used to construct the logical linkage between the two segments intended to be related. Multiple logical relationships can be constructed to create a hierarchical structure consisting of segments from multiple physical databases to create an alternative logical view of related data which can be seen by an application as a hierarchical database.

In the two segments to be related, the logical child has two parents; a physical parent and a logical parent. The leftmost field in the logical child contains the concatenated key of the logical parent that gives a symbolic address for the logical parent. An optional direct RBA pointer can be contained in the segment prefix. Thus, if an access request seeks the logical parent, but knows only the location of the physical parent, the path to the logical child (which is the child of the physical parent) is taken where, upon arrival at the logical child, the address of the logical parent is found through the key or pointer in the logical child.

Thus, many useful, logically-ruled organizational structures are dependent upon pointers amongst and between data elements to maintain logical interrelationships and indexes which, although they differ from the physical relationships of the data, depend for their continuance upon the awareness of the physical siting of any data into which pointers direct the process flow. Further, pointers allow entry to a data base at any level of the hierarchy or any instance of a segment type without traversal of the hierarchical path. If a data segment which had been pointed to by the relative byte pointer in another segment is physically moved, established secondary indexes and logical relationships are destroyed unless the new location of the moved target data can be determined. Consequently, two countervailing trends contend in IMS reorganization. The need for operational efficiency dictates periodic reestablishment of physical data clustering. But, because reorganization moves data to reestablish physical grouping and datamovement is time consumptive, the advantages of reestablished physical order come at a concomitant data base downtime price.

In conventional reorganization of an IMS database, multiple time-consuming steps are required to resolve the logical remapping required by the physical segment movement implicit in reorganization. For example, current reorganization technology does not determine new RBA's for reloaded segments until that segment is actually reloaded into the new dataset. Such RBA determination in the multi-step process of prior art reorganization results in significant subsequent time-consuming RBA resolution overhead.

Initially, in conventional reorganization, the data base to be reorganized (target) is unloaded. As the data is then loaded into a new data set to restore physical order, a record is written to a WF1 type file for example which notes the existence of this segment and its RBA in the new data set. The work file may, in some cases, also note secondary relationships.

Data bases or independent partitions which contain segments to which segments of the target data base are related are scanned by another utility such as DB Scan for example, to determine the presence and position of any such logically related segments. This information is written to a work file similar to the one generated by the load process. Similar scans are run against any other data bases which include segments to which segments of the reorganized data base bear a logical relationship.

After all databases being reorganized have been re-loaded and any other databases participating in logical relationships, but not being reorganized are scanned, the typically lengthy process of prefix resolution can begin. This is sometimes done in serially or in parallel groups of operations. All the work files from the various load and scan processes, such as the WF1 files, are input to the prefix resolution process and sorted. After sorting, logically related segments from the respective databases are matched and yet another work file is created that will be used to update the segment prefixes and pointers in a subsequent prefix update step.

Segment prefixes are updated with the new RBA of their counterparts in related databases. Items updated are logical parent counters and, if virtual pairing is used, "logical child first and last pointers", logical child's logical parent pointers and when virtual pairing is used, the logical twin forward and backward pointers. This process is run for each database in the relationship.

When a database is reorganized, the area being reorganized becomes unavailable and, therefore, the data resident in the area under reorganization becomes unavailable. As the multiple steps conventionally required. for reorganization are executed, the area under reorganization can be unavailable for lengthy periods which can, on occasion, last for days. Consequently, techniques for rapid reorganization of databases have significant practical and financial value. Therefore, what is needed is a system and method for more rapid database reorganization.

SUMMARY OF THE INVENTION

The present invention provides a system and methods for rapid unloading and reorganization of hierarchical databases. The system and method of the present invention may be used in unloading segments to an external file for example and another method of the present invention includes calculation of the RBA for the segment before it is reloaded into the new dataset. The characteristics of the output datasets are known before the first segment is actually moved from the dataset to be reorganized. The reorganization step known as "prefix resolution" is, therefore, eliminated with a consequent significant reduction in reorganization elapsed time.

In a preferred embodiment, all overflow and a window that is a DBD defined "SCAN cylinders" of blocks are read into memory. After this, unloading of database record segments by RBA may commence. As unloading proceeds, the window moves ahead while expanding until, in a preferred-embodiment, it has expanded to include the block from which the unload is proceeding plus a DBD defined SCAN cylinders of blocks forward from that point as well as a SCAN cylinders of blocks behind that point. For the following exposition, as the unload is underway, a "scan cylinders" window of blocks refers to this entire window. As the database is unloaded, most of the RBAs of the segments unloaded resolve to the areas where IMS normally places these segments, i.e., a block already read from the dataset, a block in the scan cylinders window, or the overflow area. Therefore, segments unloaded will have been read into memory in the present invention. In the rare instance where IMS has placed a segment to be unloaded in a location other than dataset overflow or within the scan cylinders window, a random I/O can be performed to read that segment's block so that as such a segment is unloaded, that segment has been read into memory. Preferably, the reading of sequential blocks stays about scan cylinders ahead of the unload. This inhibits real memory over-commitment and waits for blocks to be read.

As a segment is unloaded, its space is converted to free IMS space and when appropriate, combined with adjacent free space already in the block. Thus about "scan cylinders" behind the unload point in the data base, all of the segments in a block will have been converted to free space making the block one unit of free space. There will then be no further references to this block and it may be page released back to the OS memory management. Thus no paging subsystem I/O occurs. In those instances where data remains in the block at the conclusion of the unload, an error is noted that would otherwise have gone unnoticed. In other instances, when an attempt to unload a segment residing in free space is made, another type of error that would heretofore have gone unnoticed is found, namely, an RBA pointer loop.

When a new database is populated with segments from a disorganized database, the invention provides methods for advance calculation of what the segment RBA is going to be in the database to be reloaded. The space search algorithm used in the actual load of the new data set is used in a proxy load of a proxy dataset. The proxy dataset consists of proxy blocks. Each proxy block in the proxy data set is represented by a counter that denotes the space available in the proxy block.

Segments are unloaded in an algorithmic order that corresponds to a hierarchical relationship in the database. This corresponds to the state of initial load when segments within a record are physically stored in hierarchical sequence. In alternative embodiments, alternative algorithms representative of other logical hierarchies may also be used. As the segments are unloaded, rather than a literal load of the proxy dataset, the length of each segment is sequentially deducted from the proxy block counter. Alternative embodiments may use counters that can be accumulated to contemplate the size of the segments. Because, in a preferred embodiment, the proxy load uses the same algorithm that will be used to actually populate the new reorganized dataset, at each proxy segment load, the counter may be used to calculate the RBA the segment will exhibit in the reorganized dataset.

The indicated future or new RBA is recorded. In a preferred embodiment, the future RBA is stored to a table. Also stored in the table is the segment's current RBA. The table is indexed by hashing (preferably) or sorted (alternatively) by current (soon to be prior) RBA. For databases that contain segments logically related to segments in databases to be reorganized, a scan parses other datasets or databases for segments that participate in logical relationships with segments in the dataset under reorganization. The logical parent or logical child RBA pointer of such segments is used to search the RBA table. When a match is found, the RBA in the segment's prefix is replaced with the corresponding new RBA found in the table. For segments in databases being reorganized, the RBA for segments in logical relationships is used to search the RBA table. When a match is found, the new RBA is placed in the segment pointer field in place of the old or prior RBA.

DETAILED DESCRIPTION OF THE PREFERRED EMBODIMENTS

Figure 1:
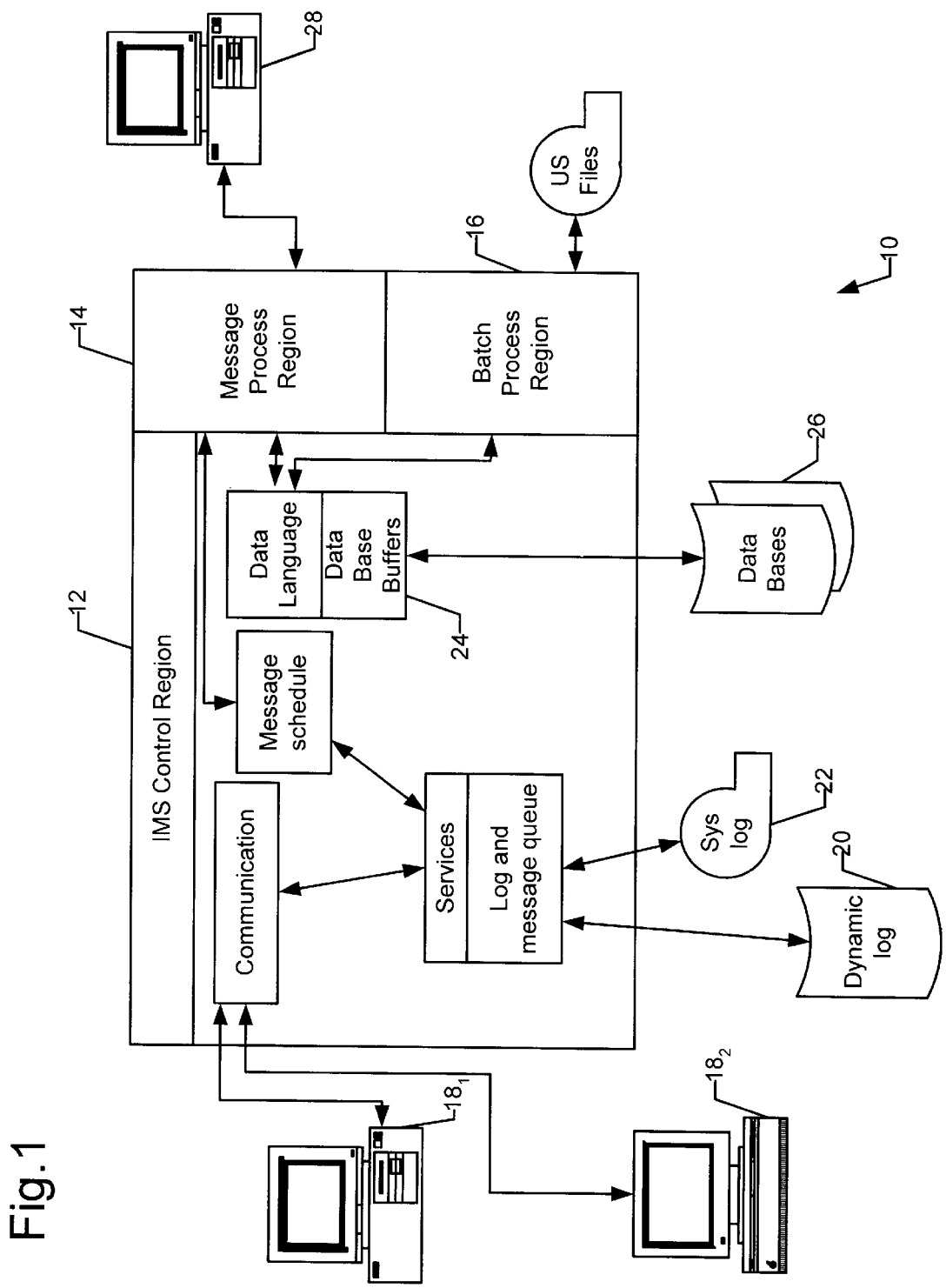
FIG. 1 depicts an example IMS operating environment.

FIG. 1 depicts an exemplar IMS operating environment 10. There are three basic processing regions in an IMS system: Control region 12, message region 14 and batch processing region 16. Control region 12 accepts messages from terminals $18_1$ and $18_2$, builds transactions and queues messages. It also logs all message and database activity to logs 20 and 22. It manages database buffers 24 and controls usage of databases 26.

Message processing region 14 is used to process on-line programs which process transactions. Message processing region 14 communicates with the message queue and databases 26 to store and retrieve data through Data Language 1 (DL/I) the IMS access language.

Batch processing region 16 is used to process batch programs run under the control of the IMS DB system. Batch programs have access to databases 26. Thus, as shown in FIG. 1, databases 26 are accessed by a variety of systems in an IMS environment and are subject to addition of and deletion of data through a variety of sources.

Figures 2, 7:
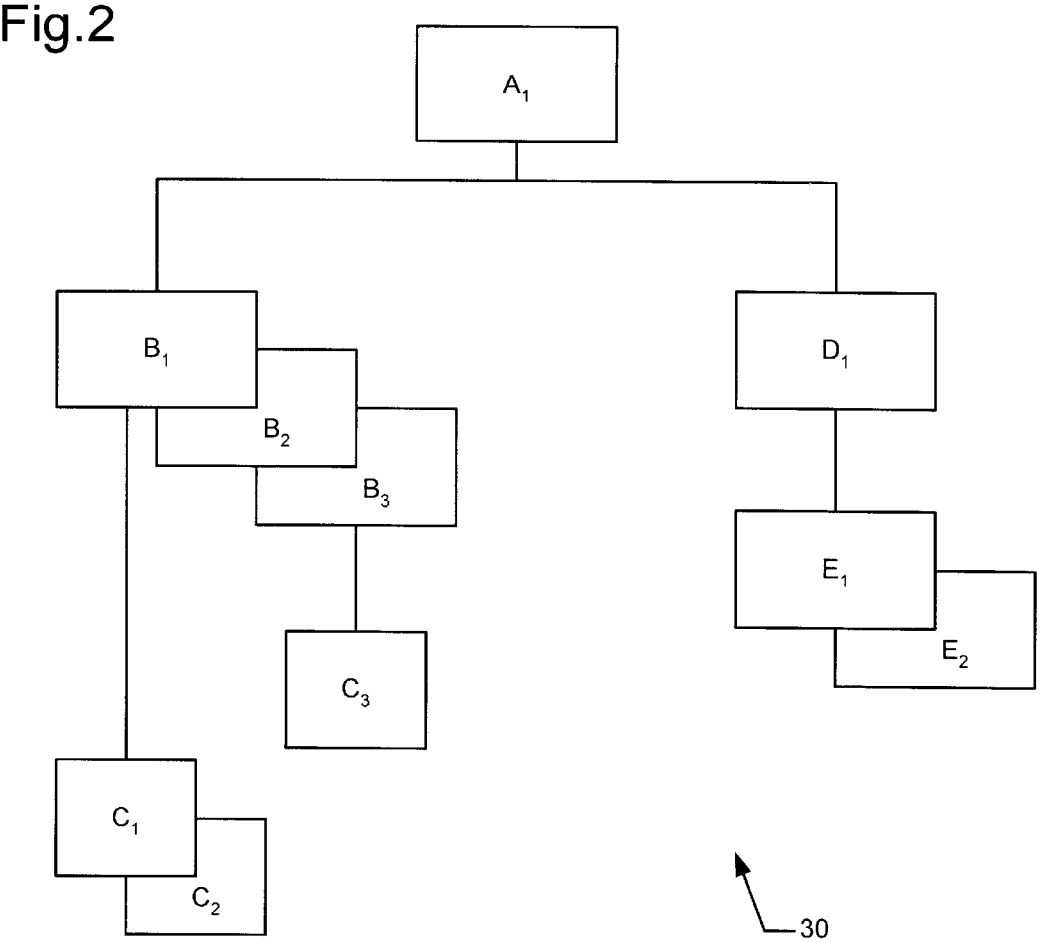
FIG. 2 is a schematic diagram of a database record.
FIG. 7 depicts segments of FIG. 4 as reorganized in accordance with the present invention.

FIG. 2 is a schematic depiction of a database record 30 consisting of segments $A_1$, $B_1$, $B_2$, $B_3$, $C_1$, $C_2$, $C_3$, $D_1$, $E_1$ and $E_2$. A standard IMS hierarchical order accesses segments top to bottom and left to right. Consequently, in an hierarchical access, IMS will access record 30 in the following order: $A_1$, $B_1$, $C_1$, $C_2$, $B_2$, $B_3$, $C_3$, $D_1$, $E_1$, and $E_2$. Those of skill in the art will also recognize that the enumerated segments may not all be of the same size.

Figure 3:
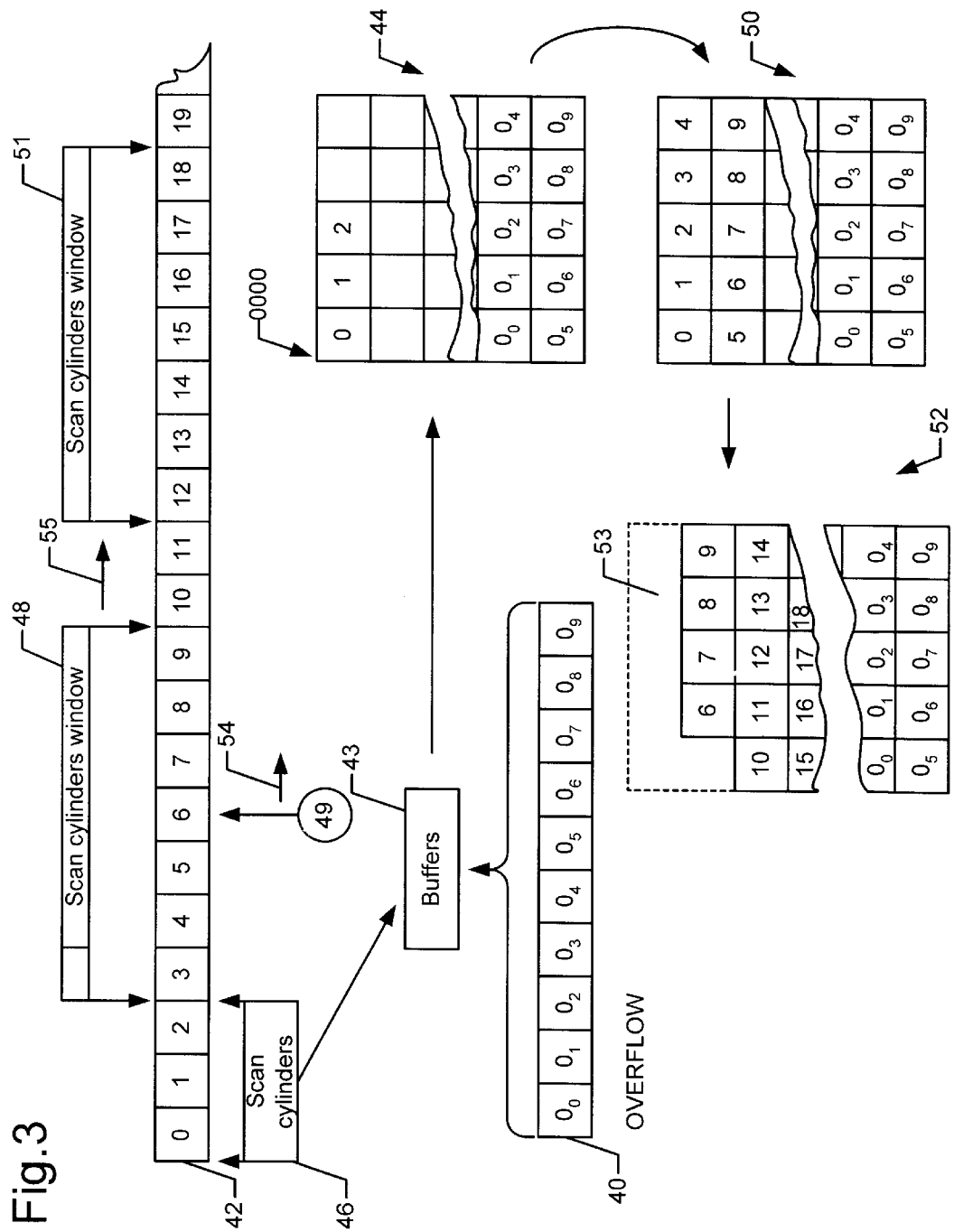
FIG. 3 illustrates a method of the present invention.

FIG. 3 represents a database as areas 42 and overflow area 40 composed of blocks 0, 1, 2, 3, 4, 5, 6, 7, 8, 9 (etc.) and overflow o0, o1, o2, o3, o4, o5, o6, o7, o8, o9. The overflow area 40 and a scan cylinders of blocks from area 42 are read into a pool of buffers depicted by block 43. The blocks are then moved into a data space having a large addressing range which as those of skill in the art will recognize is about 2 billion bytes. Further noted, an IMS data set can reach approximately 8 billion bytes in size. Consequently, in the method under discussion, it can take up to four data spaces to completely process a maximally sized data set.

In FIG. 3, the data space is shown in various states as data spaces 44, 50, and 52 and the associated multiple states of the window shown in states 46, 48 and 51 as the data is read from the database. Data space 44 corresponds to the window of reference 46 as the initial SCAN cylinders amount of blocks is read. Overflow is shown near the end of data space 44. The blocks from database 42 are placed in data space 44 by RBA. Consequently, as block 0 from database 42 had an RBA of 0000, it is placed at location 0000 in data space 44.

The window is shown in various states (46, 48, and 51) to depict the progressive read of the database into the data space. When the window has moved to state 48, the data space now shown by reference 50, is now populated with o0, o1, o2, o3, o4, o5, o6, o7, o8, o9 and blocks 0, 1, 2, 3, 4, 5, 6, 7, 8, and 9. Once the initial SCAN cylinders of data has been read into the data space, an unload may begin. The unload point as related to the moving window in state 48 is shown as reference 49. The arrow 55 depicts the forward progress of the window as the arrow 54 depicts the associated forward progress of the unload 49.

Given a typical cylinder, there may be 180 blocks of 4096 bytes each. As an example, a "SCAN cylinders" as set during the DBD may be be 3 cylinders. Given this, a typical scan cylinders window (as the term is used in this exposition) would, when the unload is well into the database, consist of the block from which the unload is proceeding, plus a SCAN cylinders of blocks forward from that point (3 cylinders) as well as a SCAN cylinders of blocks behind that point (3 cylinders) for a total window or alternatively, scan cylinders window size of 7 cylinders.

Those of skill will recognize that as the process reaches the end of the database, the window will shrink accordingly. Each block contains many segments. Thus as the blocks is read into the data space, a large amount of blocks are available for immediate unloading after the first SCAN cylinders of blocks has been read.

The process begins at a root segment. Because there are generally multiple roots in a data base, the process of the invention may proceed by multiple threads, each starting with a different root and continuing until either the beginning of another thread or the end of the data base is reached. At the conclusion of a multi-thread process, the results are concatenated as known in the art to result in the comprehensive processing of the data base.

Scan cylinders window 46 depicts the initial read of a SCAN cylinders amount of blocks (i.e. in this example, 3 blocks). An unload proceeds by the hierarchy. During an unload, there will be references to segments in the three cylinders ahead of the read point shown in FIG. 3 at reference 49. For example, when the scan cylinders window is in state 48, an unload at reference 49 may be underway. To prevent the read from going too far ahead of the unload, the scan cylinders window is coordinated with the unload.

As the unload proceeds, space becomes available in the data space. For example, as the window proceeds forward to it state shown by reference 51, the data space is as shown in reference 52. Some point behind the unload, blocks will have been cleared of data. Therefore, blocks 1, 2, 3, 4, and 5 are shown as not present in data space state 52 and the area once occupied by those blocks, reference 53, has been explicitly freed back to the operating system. As the blocks are removed of data, space 53 has been freed and is released back to the operating system. Those of skill will recognize that all the segments of a block could be unloaded even though "prior" blocks could have segments remaining in the data space. Thus the depiction of FIG. 3 is simplified in that it shows the unloaded of blocks 0, 1, 2, 3, 4, and 5 when blocks 0, 1, 2, 3, 4 and 6 could have as easily been shown to have been completely unloaded.

Upon completion of the unload of the database, the present invention provides the capability to discern errors that would otherwise not have been noted so readily. If the blocks that have been converted to free space are examined and information yet remains in that block, an error is revealed by the method of the invention. In other instances, when an attempt to unload a segment residing in free space is made, another type of error that would heretofore have gone unnoticed is found, namely, an RBA pointer loop.

An alternative method of determining free space in a block during the unload process uses a counter representative of the capacity of each block in the data space. The counter is set to the amount of free space in the block. As a segment is unloaded from a selected block, the counter indication of the amount of free space in the block is increased. When the block is entirely free space, the counter will indicate the capacity of the block.

Returning to the segments denoted as $A_1$, $B_1$, $B_2$, $B_3$, $C_1$, $C_2$, $C_3$, $D_1$, $E_1$ and $E_2$ in FIG. 2, for the following illustrative purposes, segments of types A, E, and D will be deemed to be 1 "unit" in size, while segments of type B will be deemed to be 2 "units" in size and type C segments will be considered to be 3 "units" in size. A "unit" is an arbitrary measure of relative size used to illustrate the principles of the present invention. As the following exposition proceeds, those of skill will recognize the use of simple unit denotations as being illustrative of segment size (including pointers, prefix and data) to be helpful in depicting the invention.

Figure 4:
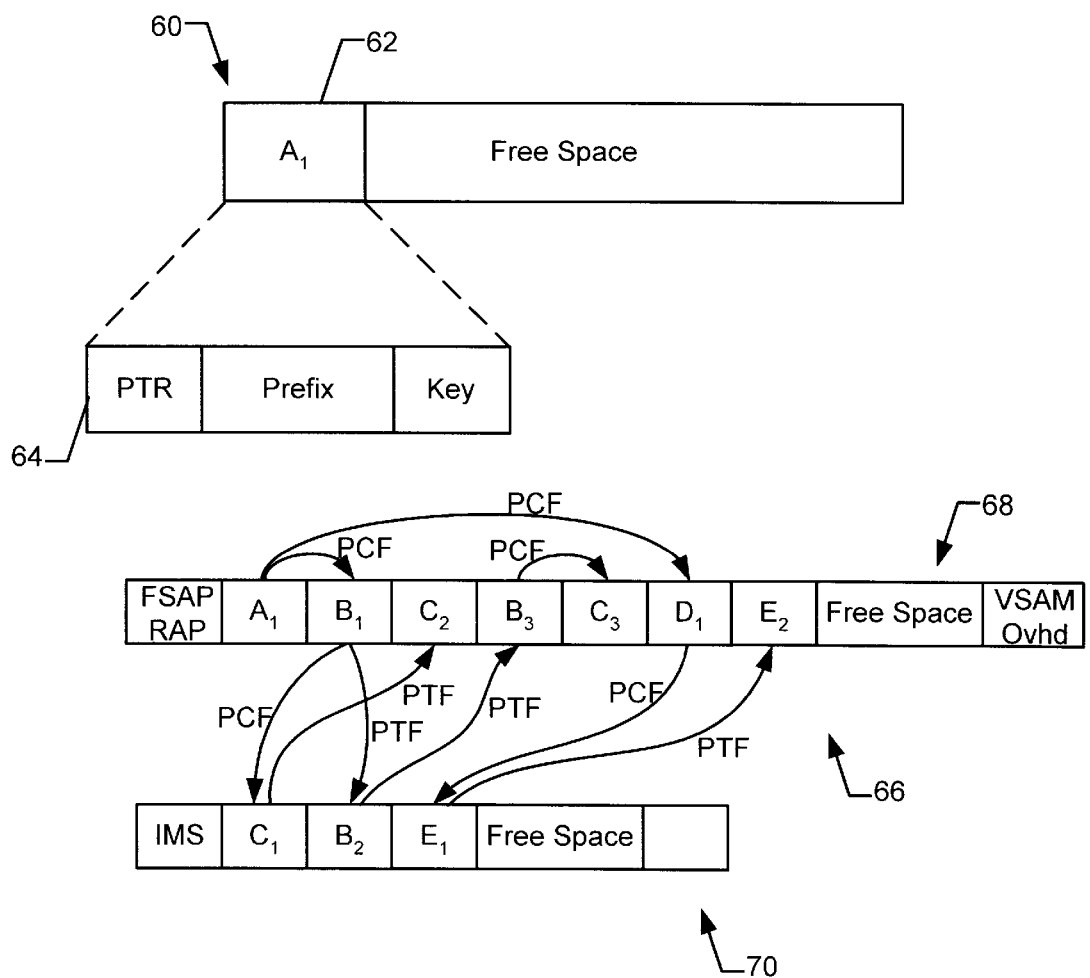
FIG. 4 illustrates record 30 of FIG. 2 as stored in a heuristic Hierarchical Indexed Direct Access Method (HIDAM) environment.

FIG. 4 illustrates record 30 of FIG. 2 as stored in a heuristic Hierarchical Indexed Direct Access Method (HIDAM) environment. A dataset 60 is a depiction of a KSDS index dataset. Record 30 has a root segment A1. Therefore, the pointer, prefix and key of A1 are stored in index dataset 60 as shown by reference indicia 62 and in enlarged depiction 64. ESDS dataset 66 consists of root addressable area 68 and overflow area 70. As shown, record 30 is disorganized in ESDS dataset 66.

The depicted access method is HIDAM. Consequently, there are available inter-segment pointers that are more complex than mere sequential. For example, there are physical child forward pointers ("PCF") from A1 to B1 and from A1 to D1. There are PCF pointers from B1 to C1 as well as from B3 to C3 and from D1 to E1. There are also physical twin forward ("PTF") pointers from C1 to C2 and from B1 to B2 as well as from B2 to B3 and from E1 to E2. As those of skill will note, there are many other potential pointers implicit but not shown in the depiction. The PTF and PCF pointers are shown in FIG. 4 as identified arrows PCF and PTF.

As FIG. 4 shows with the PCF and PTF arrows, even a basic sequential access through record 30 will require numerous traversals across RAA 68 to overflow 70. As earlier discussed, this leads to significant inefficiency that could be mitigated by reorganization. The disorganized state shown in FIG. 4 is exaggerated to illustrate the invention. In practice, the IMS placement algorithm results in a more efficient segment placement than the depiction of FIG. 4 depicts, but the depiction illustrates the principles of the invention. The physical siting of the segments as shown in FIG. 4 leads to considerable wasted time when an access of dependent segments of the record is indicated. For example, should an access require the data of C1 and then C2, the read head would have to move to overflow area 70 to access C2 after C1, a probably frequent requirement given the twin nature of C1 and C2.

Figure 5:
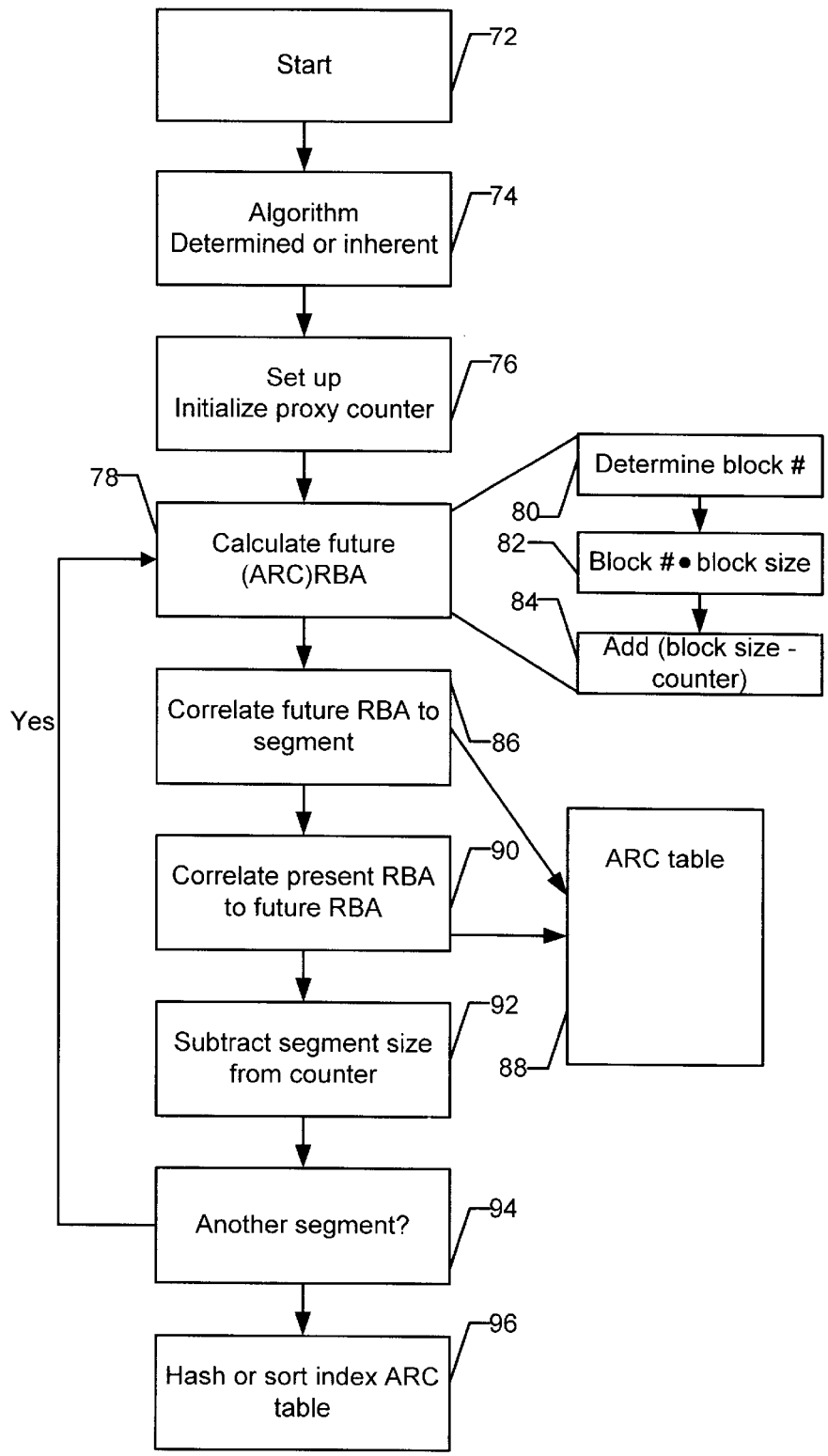
FIG. 5 illustrates a method in an example preferred embodiment of the present invention.

FIG. 5 illustrates a method in an example preferred embodiment of the present invention. Again, rather than literal segments sizes, "units" are used as the dimension of size for segments and datasets. In the method of the present invention, the data space is unloaded by a hierarchical algorithm. Although any algorithm may be used if it expresses either inherently or literally a functional or hierarchical relationship amongst segments of the record, a straight-forward hierarchical algorithm that corresponds to a hierarchical read of the record is illustrated here. The physical placement of record segments in the new dataset will correspond to whatever algorithm is used.

The process starts as shown at process block 72 of FIG. 5. At this time, the data space as described earlier with reference to FIG. 3 has been populated with at least approximately a scan cylinders of blocks. This is not required, but is preferred. As shown by reference 74, the unload algorithm is determined or may be inherent such as would be the case in a standard hierarchical unload. In a preferred embodiment, for each block of the contemplated reorganized database dataset, a proxy counter is set up and initialized to correspond to the available size of the represented block (represented by reference 76 of FIG. 5). Available size refers to the amount of space in that block that may be occupied by segments. The available block size is the actual block size less any VSAM or IMS overhead. Those skilled in the art will recognize that for the purposes of this exposition, that in a VSAM environment, a control interval is generally synonymous with a block.

The proxy counter would indicate for block 0, if OSAM block 1 and other bit map blocks, a value of 0000. As the first segment is unloaded from the data space, the determination of the future RBA is made. After counter set-up, the determination of the future RBA, also known as the Advance RBA Calculation or "ARC RBA" by the assignee of the present invention, is calculated as shown by reference 78 of FIG. 5 which is expanded into processes 80, 82, and 84 to illustrate the terms of that calculation. The block number is determined as shown by reference 80. The determined block number is multiplied by the block size (reference 82) and to that result, the difference between the block size and the current counter state is added (reference 84). If the data set is VSAM, the result is reduced by 7 to compensate for the VSAM overhead.

Returning to the main flow of FIG. 5, the now determined future or ARC RBA is correlated to the segment. That correlation is effectuated in a preferred embodiment by the creation of a table or ARC table shown in FIG. 5 as table 88 or other compilation to correlate the future RBA with the segment. In the table or other correlation, the present RBA is also correlated with the future RBA as shown by process reference 90. The determined size of the segment is subtracted from the counter as shown in process reference 92. Whether another segment ARC RBA is to be calculated is indicated by reference 94. If so, the process returns to process reference 78 and, if not, the ARC table or compilation may then be indexed preferably by hash or a sort by old or prior RBA performed as indicated by process reference 96.

As an example, a proxy counter is initialized. The example target block is to have 32 units in size. Consequently, the proxy counter is set up to be able to indicate available space which is 32 minus IMS and VSAM related space consumption which for this example is set up to be 2 units for a total available space of 30 units. IMS and VSAM contemplation is preferred but not necessarily required.

As a segment is unloaded, the future RBA is calculated. Those of skill in the art know techniques to determine the block number to which the segment will be loaded. For the first segment of block 0, the block number is 0, the available block size is 30, leaving a product of 0. Now, from the available block size which is 30, is subtracted the current counter (which is 30) leaves an ARC RBA for segment A1 as 00. Now, recalling that A1 was for this example said to be 1 unit in size, 1 is subtracted from the counter.

The next segment for which a future RBA is determined shall be B1. B1 is said to be 2 units in size. The calculation is as follows: the block number is 00 and multiplication of 00 by the block size leaves 00. To that is added the difference between the available block size which is 30 minus the counter which is at 29. This results in a future RBA for B1 of 1. Now, the counter is decremented by the size of B1 which is 2 units, leaving the counter state as 27.

Figure 6A:
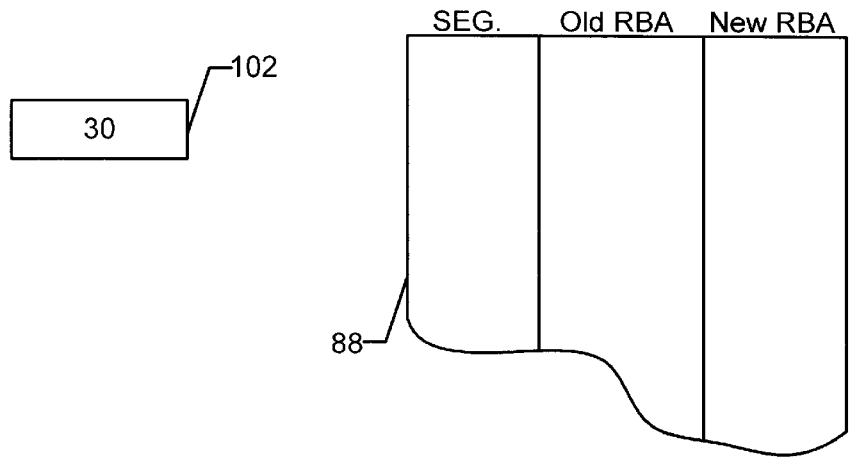
FIGS. 6A, 6B, and 6C depict an RBA table in various states of population according to a preferred embodiment of the present invention.

FIG. 6A illustrates in more detail RBA table 88 seen in FIG. 5 and counter 102 at the start of the population of table 99 in accordance with the present invention. In the FIG. 6A view of table 88 and counter 102, the counter is shown indicating a space available count of 30. As discussed above, the first available space in the ESDS dataset block 0 is arbitrarily chosen to be at 30 units. Consequently, counter 102 indicates 30 at the start of the process.

Figure 6B:
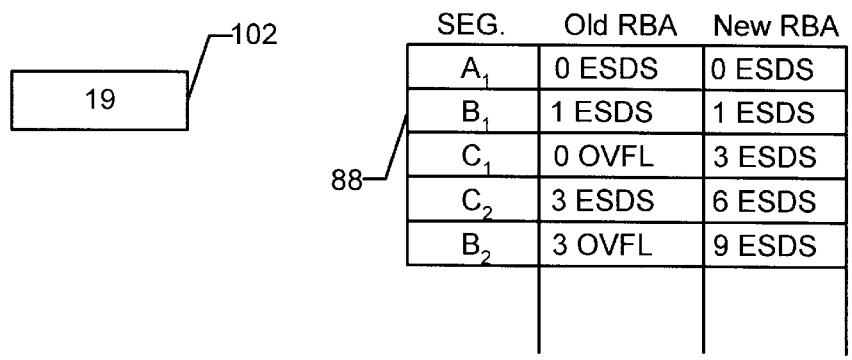

FIG. 6B depicts the state of counter 102 and table 88 further into the process. The RBA designations in example table 88 indicate whether the segment has an RBA indicative of ESDS or overflow placement by the designations ESDS and overflow, respectively These are for illustrative purposes and show that as the new RBA calculation process proceeds, the segments are being identified for placement in the ESDS area with greater density than they previously exhibited in FIG. 4. For example, for segment C1, the old RBA is 0 overflow while the new RBA computed by the present invention is 3 ESDS.

Figure 6C:
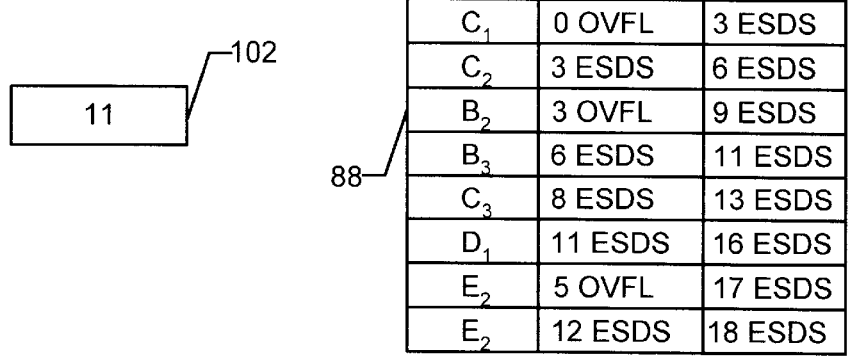

FIG. 6C shows the state of table 88 after segments A1–E2 have been traversed. FIG. 7 illustrates the placement of the segments of record 30 in the new dataset after reorganization and shows beneath the ESDS RAA the new RBAs for the segments of record 30.

The present invention improves resolution of logical relations in database reorganization. Although those of skill know the topic, a simple background may assist those outside of the field to understand its benefits. Logical relations allow the combination of segments from more than one physical database in a logical database or allow a logical reordering of the hierarchical structure within a single physical database.

Figure 8:
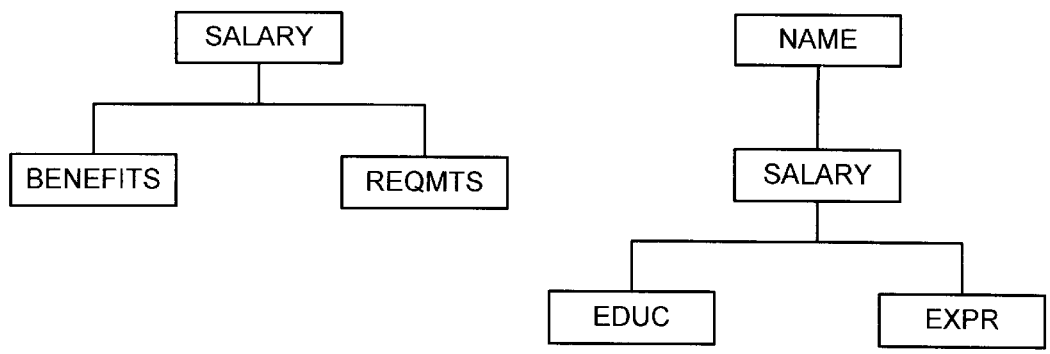
FIG. 8 depicts two simple databases.

In FIG. 8, two databases are shown, SALARY (with "SALARY" at the top of the structure depicted) and NAME. In the SALARY database, an application can determine the names of employees having a certain salary. In the NAME database, an application can determine the salary of a particular employee. There is a salary segment in both databases. Because different individuals will have access to the two databases, redundancy of the SALARY segment can lead to integrity problems as well as space consumption.

Figure 9:
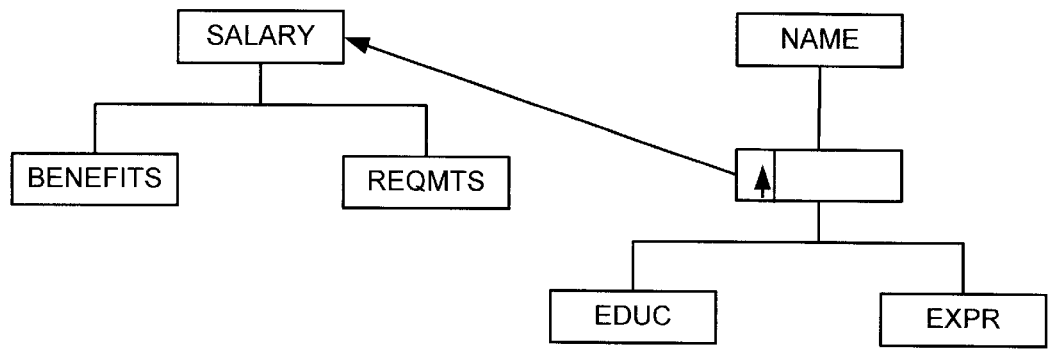
FIG. 9 depicts the two databases of FIG. 8 as modified to exhibit a logical relationship.

To implement a logical relation, the data is removed from the SALARY segment in the NAME database and another pointer (for example a four-byte address for a direct pointer known as a LOGICAL PARENT POINTER) is placed in the prefix of that segment to point to the salary segment in the SALARY database. This is shown in FIG. 9.

Now, IMS DL/I support of logical relations enables a program to start with name in the NAME database and find the salary for that employee. As IMS DL/I accesses what would have been the salary segment under the NAME database, it recognizes that it is now a pointer segment and it follows the Logical Parent Pointer to the salary segment in the SALARY database. IMS DL/I then provides this information to the application program. The pointer segment is the physical child of the name segment in the NAME database and is the logical child of the salary segment in the SALARY database. The salary segment in the SALARY database is the logical parent of the pointer segment. This is a unidirectional logical relation. Additional pointers allow the process to go the other direction.

In the present invention, when a segment is unloaded that participates in a logical relationship, either by being a logical child or logical parent, the ARC table will include the prior RBA, the ARC RBA, and if a logical parent, its counter (the counter being further described below). When the entire database (or smaller unit alternatively) is unloaded, the ARC tables are hash indexed (or sorted) by prior RBA. Preferably, there are two ARC tables for each database dataset: one for logical parents and one for logical children and/or secondary index target segments. When the logical relationship is physically paired or unidirectional and there are no secondary indexes, there is only one ARC table per dataset.

The database to scan for logical relations is parsed sequentially block by block while multi-volume datasets are processed in parallel. Each block is parsed. When a segment is found that participates in a logical relationship with a database that is being reorganized, its logical parent or logical child RBA pointer is used to search a sorted ARC table of the database being reorganized. Preferably, a hash index search is employed.

Recalling that the ARC table is preferably hash indexed by prior or "old" RBA, when a match between the RBA pointer of the segment involved in a logical relationship is found in the ARC table, that RBA pointer is replaced with the ARC RBA. Any reasonable technique for rewriting the updated segments to their respective databases may be used.

The process is implemented during the load process for segments in the database being reorganized that participate in logical relationships. When the segment to be loaded a participates in a logical relationship, the RBA for its logical parent, logical twin, or logical child is used to search the appropriate ARC table. When a match is found, the ARC RBA is placed in the segment prefix in place of the "old" RBA. When no match is found in an ARC table for a given RBA, there may be a corrupt database or bad pointer which should be corrected before resumption of service.

In IMS DL/I, a counter field is used to determine the total number of logical children of a given logical parent. A given segment type can be involved in several logical relationships as a logical parent, but will have only one counter field in its prefix. The value of the counter represents the total number of logical children in all relationships. In some cases, the counter can be simply retained across a reorganization. It is safer however, to redetermine the counter.

The counter field is carried across the reorganization but the value is recomputed. Generally, the new value will not be known until the segment with the old counter value has been written to the reorganized dataset. During load or prefix update, each time a logical child's logical parent's RBA is updated with the ARC RBA value, an ARC counter is incremented. When the database with the logical parent is completely loaded and all databases containing its logical children have been loaded or scanned, the counter and ARC counter for each logical parent should be equal. This may require accumulation of counters from several ARC tables depending upon with how many different logical relationships the particular segment was engaged. When the counters do not correspond, an error was present in the database and the new counter value should replace the one in the segment prefix.

Figure 10:
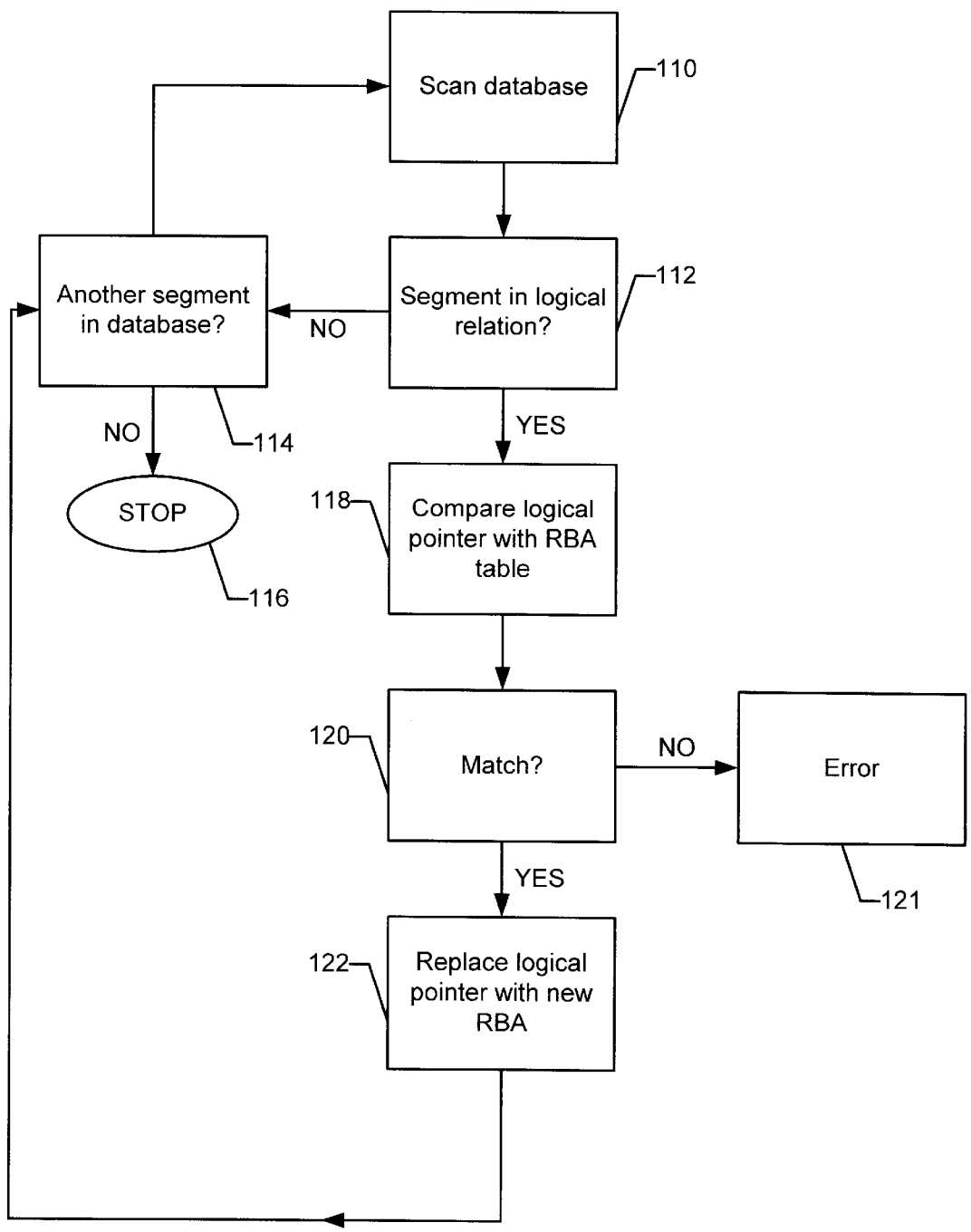
FIG. 10 illustrates update of pointers in segments that participate in logical relations in a preferred embodiment of the present invention.

FIG. 10 depicts the improvement in resolution of logical relationships effectuated in a preferred embodiment of the present invention. The process starts at block 110 that depicts the well known "scan" of databases with segments involved in logical relations with segments in the database under reorganization. Block 112 depicts the analysis of whether the segment is involved in a logical relation. If not, the process proceeds to block 114 which illustrates the determination of whether all segments of the database have been scanned. If so, then a STOP is reached at reference 116. If not, the scan continues as shown by the return to block 110. If the segment is found in block 112 to participate in logical relations, the logical pointer is compared at block 118 with the RBA table of the database under reorganization. If there is a match as signified by block 120, the logical pointer value is replaced as shown by process block 122, with the new RBA taken from the RBA table or compilation. The process returns to block 114 to determine if there is another segment in the database under scan.

As those of skill in the art will recognize, symbolic pointers will not require conversion because they should not change with change in location of the segment to which they point. Yet, if there is no RBA to ARC RIBA conversion, there will not be an accumulated total of logical children for a given logical parent. This should be determined nevertheless. Those of skill will recognize that the principles of the present invention may be used to create a symbolic table with associated counters to complement the ARC tables. As an alternative, a sort/merge program may be used sort, match and count these relationships. Validation of symbolic pointers as known in the art is a preferable adjunct to the present invention when symbolic pointers are present.

Secondary indexes are readily contemplated with the present invention. The secondary index can be simply updated with the RBA of the index target database. A high speed sequential load is preferably used to replace the old RBA with the ARC RBA while the main database in reloaded. This eliminates the need to sort the entries in a secondary index prior to its load.

The secondary index itself may be reorganized. The old entries are sequentially unloaded, the old RBA replaced with the ARC RBA, then while the main database is being reloaded, the secondary indexes can be sequentially reloaded without any sort required.

In alternative embodiments, the secondary index can be recreated during database reorganization. The secondary index entries are built during database unload and include the index target segments' ARC RBA. When the unload completes, the index entries are sorted. When all unloads are complete, the secondary index can be loaded.

Those of skill will recognize that the techniques of the present invention may be implemented to advantage in a variety of sequential orders and that the present invention is to be generally implemented in magnetic media such as disks, tapes and CD-ROMS or other storage media for introduction into an IMS system as a utility adjunct. In such cases, instructions for executing the steps of the invention in an IMS environment will be embedded in the media. The present invention should not be construed to be limited to IMS database systems as the techniques of the invention are applicable to any database system where hierarchical storage of related data elements is maintained or functional. Consequently, the scope of the invention should be construed to be limited only by an appreciation of the following claims.

We claim:

1. A method for unloading blocks of a hierarchical database, the method comprising the steps of:

reading into a buffer pool, overflow area data and a window of blocks of a hierarchical database;

placing the overflow area data and the window of blocks in an addressable data space, the placement of the scan cylinders amount of blocks being at locations in the data space that correspond to the block locations in the hierarchical database from which they are read; and after overflow area data and the window of blocks has been placed in the data space, commencing hierarchical unloading of the segments placed in the data space while continuing the reading of blocks into the buffer pool and placement of blocks into the data space.

2. The method of claim 1 in which the window of blocks is a scan cylinders amount of blocks.

3. The method of claim 1 in which segments are unloaded from the data space to a new data base.

4. The method of claim 3 in which as the segments are unloaded from the data space to a new data base, the RBA that an unloaded segment will exhibit in the new data base is computed.

5. The method of claim 4 in which the RBA that an unloaded segment will exhibit in the new data base is computed by determination of the block number of the block to which the unloaded segment is to be placed;

multiplication of the determined block number by the block size to obtain a product;

addition to the product, the difference between the block size and a state of a counter to arrive at a future RBA for the unloaded segment.

6. The method of claim 5 in which the counter is one of plural counters established to correspond, one to one, with a plurality of the blocks to be unloaded, the counter representative of the size of the block to which it corresponds.

7. The method of claim 5 in which the counter has the capacity to indicate the size of the block to which the segment will be loaded and in which the state of the counter is indicative of the size of the block to which the segment will be loaded minus the cumulative size of the segments which have previously been loaded to that block.

8. The method of claim 5 further comprising the step of subtracting from the state of the counter, the size of the segment being unloaded.

9. The method of claim 5 in which the future RBA and the present RBA of the segment are correlated.

10. The method of claim 9 in which the correlation is through a table.

11. The method of claim 10 in which the table is indexed.

12. The method of claim 5 further comprising:

correlating and ordering present and future RBA for a plurality of segments in a data set under reorganization;

scanning a database to determine for a selected segment, whether that selected segment participates in a logical relationship with a segment in the data set under reorganization;

upon finding a segment that participates in a logical relationship with a segment in the dataset under reorganization, comparing the logical pointer of the found segment with the correlation of present and future relative addresses for plural segments in the dataset under reorganization to find the present relative address that corresponds to the logical pointer of the found segment; and upon finding the corresponding present relative address, replacing the logical pointer of the found segment with the future relative address that is correlated with the corresponding present relative address.

13. A method for unloading blocks of a hierarchical database, the method comprising the steps of:

reading into buffers and thereafter into a data space, the overflow of a dataset and a selected amount of blocks of a hierarchical database;

after the overflow and the selected amount of blocks have been read into the data space, unloading in an algorithmic order, segments from the data space; and progressively continuing the read of blocks into the data space as the unload from the data space progresses.

14. The method of claim 13 in which the selected amount of blocks is a scan cylinders amount of blocks.

15. The method of claim 13 in which, after a block has been unloaded of data from the data space, releasing back to the operating system the space of the data space in which the unloaded block resided.

16. The method of claim 15, further comprising the step of examining the data space to determine whether residual data of a block remains in the data space.

17. The method of claim 16 in which the examination of the data space is by a counter.

18. The method of claim 15 in which the data space is monitored for accesses to there residing segments.

19. The method of claim 13 in which the selected amount of blocks behind an unload point in the algorithmic order of unloading, space in the data space occupied by previously loaded blocks is released back to the operating system.

20. A storage medium embedded with instructions that operate in an IMS computer environment to read into a buffer pool, overflow area data and a scan cylinders amount of blocks of a hierarchical database;

place the overflow area data and the scan cylinders amount of blocks in an addressable data space, the placement of the scan cylinders amount of blocks being at locations in the data space that correspond to the block locations in the hierarchical database from which they are read;

after overflow area data and the scan cylinders amount of blocks has been placed in the data space, commence hierarchical unloading of the segments placed in the data space while continuing the read of blocks into the buffer pool and placement of blocks into the data space.

21. The medium of claim 20 being magnetic tape.

22. The medium of claim 20 being a read only memory storage medium.

23. The medium of claim 20 being a disk.

24. The storage medium of claim 20 being further embedded with instructions that operate in an IMS computer environment for computation of the RBA that each unloaded segment will exhibit in the a data base by determination of the block number of the block from which the segment is taken;

multiplication of the determined block number by the block size to obtain a product;

addition to the product, the difference between the block size and a state of a counter to arrive at a future RBA for that segment.

* * * * *